United States Patent
Strong

[11] 3,857,628
[45] Dec. 31, 1974

[54] SELECTIVE POLARIZER ARRANGEMENT FOR LIQUID CRYSTAL DISPLAYS

[75] Inventor: Robert D. Strong, Chagrin Falls, Ohio

[73] Assignee: Hoffman-La Roche Inc., Nutley, N.J.

[22] Filed: Aug. 29, 1973

[21] Appl. No.: 392,633

[52] U.S. Cl. .......................... 350/160 LC, 350/150
[51] Int. Cl. ............................................. G02f 1/16
[58] Field of Search .................... 350/150, 160 LC

[56] References Cited
UNITED STATES PATENTS
3,731,986  5/1973  Fergason .......................... 350/150

Primary Examiner—Edward S. Bauer
Attorney, Agent, or Firm—Brown, Murray, Flick & Peckham

[57] ABSTRACT

A liquid crystal alpha-numeric display of the field effect type comprising a layer of nematic liquid crystal material sandwiched between transparent parallel plates, together with polarizers on opposite sides of the liquid crystal layer, and a reflector assembly behind the display. The invention is characterized in that the front polarizer on the side of the liquid crystal layer opposite the reflector assembly covers only the digit area of the display, leaving a border around the digit area which is not covered by the polarizer. This allows unpolarized light to pass through the display around the digits, giving greater contrast between the digits and the background area.

5 Claims, 3 Drawing Figures

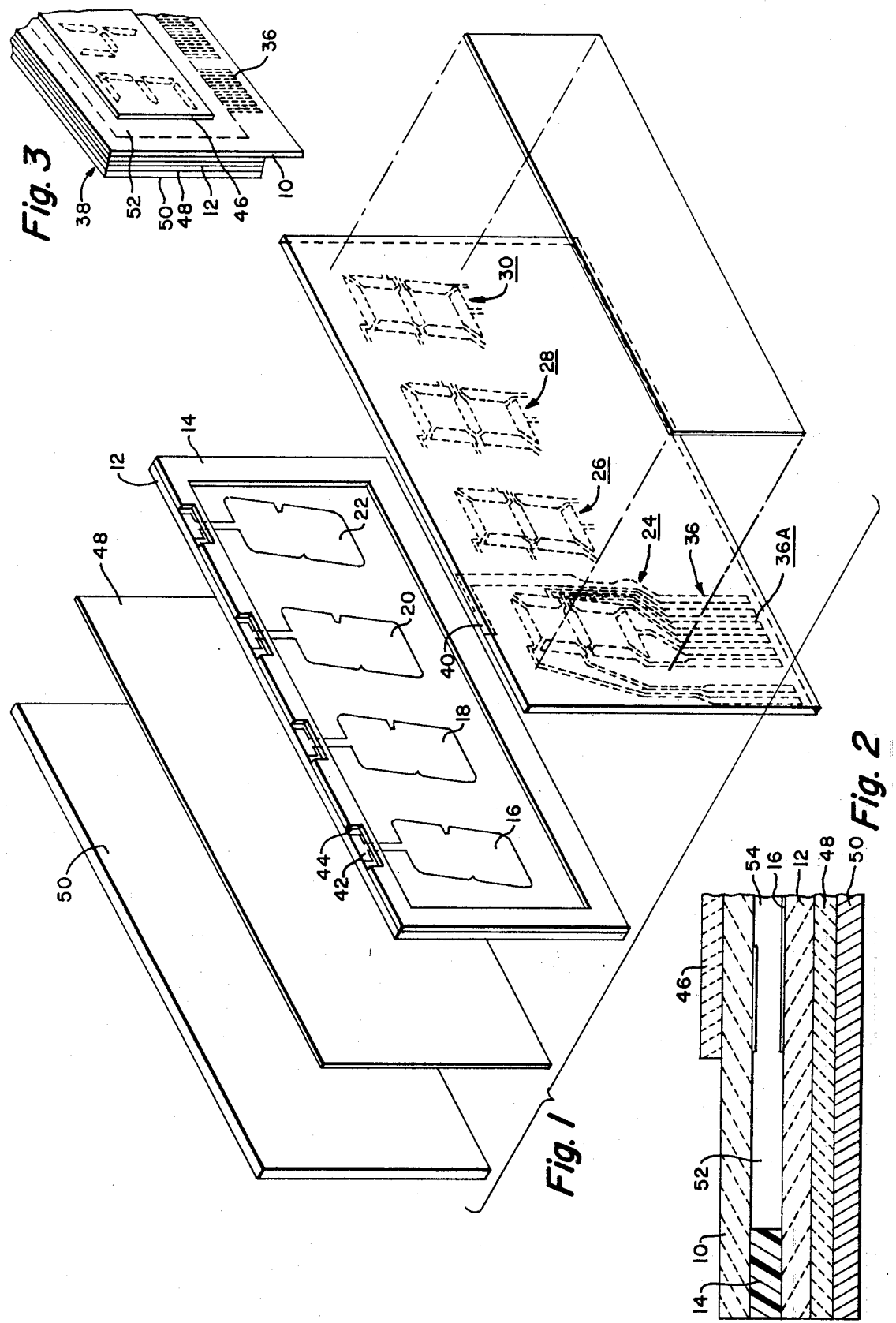

SELECTIVE POLARIZER ARRANGEMENT FOR LIQUID CRYSTAL DISPLAYS

BACKGROUND OF THE INVENTION

As is known, liquid crystal alpha-numeric displays of the field effect type comprise a layer of nematic liquid crystal material sandwiched between transparent parallel plates which are rubbed on their surfaces in contact with the liquid crystal material to produce a twisted nematic structure. On opposite sides of the liquid crystal layer are polarizers such that when an electrical potential is established between the transparent conducting films and across the liquid crystal layer, the device will change from a light transmitting to opaque medium, or vice versa, depending upon the orientation of the two polarizers. By forming the conducting films on the front transparent plate of the display in the shape of a desired optical image, that image can be made to appear or disappear, depending upon whether a potential is established between the conducting films. Furthermore, by creating separate conducting areas on the front plate, as by etching the conducting film thereon, any given number of conductive regions can be caused to appear opaque while other regions are not affected to produce any one of a number of different images or symbols (e.g., letters or numerals) with the same liquid crystal sandwich assembly.

A property of nematic-phase liquid crystal materials is that the molecules in the vicinity of a rubbed surface tend to align themselves with it. Thus, by rubbing the surfaces of the transparent plates in contact with the liquid crystal material, the molecules can be made to align in the direction of rubbing. Furthermore, by rubbing the surfaces of the front and rear transparent plates of the display at right angles to each other, the aforesaid twisted nematic structure will result which will rotate the plane of polarized light passing through the cell. However, by applying an electrical potential across the liquid crystal layer by means of transparent electrodes as described above, the nematic structure can be made to untwist, whereupon the plane of polarization of polarized light will no longer be rotated through 90°. Hence, by providing crossed-polarizers on opposite sides of the liquid crystal layer, light will pass through the cell with no potential applied across the liquid crystal layer, will be scattered from a reflector at the rear of the display, and will again pass through the polarizers and the liquid crystal layer where it can be observed as a light background. Application of an electrical potential between the transparent electrodes, however, makes the area covered by the transparent electrodes opaque since in this case the nematic structure is no longer twisted and polarized light cannot pass through the cell. Of course, when the polarizers are parallel rather than crossed, light will pass through the cell only when a field is established between the transparent electrodes.

When polarized light passes through a layer of nematic liquid crystal material of the type described above, it is partially depolarized for the reason that the liquid crystal molecules are in motion, particularly at higher temperatures. Thus, while the molecules in a nematic-phase liquid crystal material tend to lie parallel to rubbed lines on a bordering surface, their parallelism is statistical, rather than perfect and exact. They are free to move and will move with respect to one another, and there are some that are at a small acute angle with respect to the "main stream" and a few others that are at any given moment in a position even less consonant with the bulk of the others. This gives rise to the depolarization mentioned above which prevents a portion of the light from passing through the rear polarizer, resulting in a reduction in contrast between the digit or symbol area of the display and the background area.

SUMMARY OF THE INVENTION

In accordance with the present invention, a new and improved liquid crystal display is provided wherein the contrast between the digits or symbols of the display and the background of the display is materially improved.

This is achieved by providing a polarizer on the front of the display opposite the aforesaid reflector assembly which covers only the digit area of the display, leaving a border around the digit area which is not covered by a polarizer. This allows unpolarized light to pass through the front of the display such that the undesirable depolarization effect in this area explained above does not occur. Of course, when the unpolarized light strikes the rear polarizer, it is then polarized; and some attenuation of the polarized light will occur as it is reflected from the rear reflector assembly and passes out through the front of the display. Nevertheless, the overall contrast between the digit area and the background area is materially improved.

The above and other objects and features of the invention will become apparent from the following detailed description taken in connection with the accompanying drawings which form a part of this specification, and in which:

FIG. 1 is an exploded view of the liquid crystal cell of the invention;

FIG. 2 is a cross-sectional view of the assembled liquid crystal cell of the invention showing the relationship of the front polarizer to the remainder of the cell; and FIG. 3 is an end perspective view of the assembled liquid crystal cell of the invention.

With reference now to the drawings, and particularly to FIG. 1, the liquid crystal cell shown is of the field effect light shutter type described in U.S. Pat. No. 3,731,986. It comprises a pair of transparent plates 10 and 12, usually of glass, separated by means of a gasket 14. The gasket 14 typically is formed from a thermoplastic resin silk-screened onto one or both plates and has a thickness of about 0.0005 inch. The plates 10 and 12 have a thickness typically of about 0.035 inch. In the space between the plates 10 and 12 and within the enclosure formed by the gasket 14 is a layer of liquid crystal material. The liquid crystal material is of the nematic type having a positive dielectric anisotropy as taught in U.S. Pat. No. 3,731,986.

As shown in FIG. 1, the opposing surfaces of the transparent plates 10 and 12 have formed thereon patterns of transparent conducting material such as tin oxide or indium oxide. The plate 12 is provided with four patches of transparent conductive material 16, 18, 20 and 22; while the other transparent plate 10 is provided with four sets of mutually insulated strips of transparent conducting material, the four sets being identified generally by the reference numerals 24, 26, 28 and 30. When the plates 10 and 12 are bonded to opposite sides of the gasket 14, the transparent conductive patches 16-22 will be aligned with the sets of strips 24-30 on the plate 10.

The operation of the liquid crystal cell will be described hereinafter; however it will be appreciated that when all of the strips of the set 24, for example, are opaque while the surrounding areas transmit light, the resulting configuration will represent the numeral "8". Similarly, by causing selected ones of the strips in set 24 to become opaque, any numeral from 1 through 0 can be made to appear.

The various mutually insulated conductive strips in the sets 24-30 are adapted to be connected through a plurality of mutually insulated strips of transparent conducting material 36 to external leads, not shown. In this respect, it can be seen from FIG. 3 that the lower end of the plate 10 with the strips 36 thereon extends beneath the remainder of the liquid crystal cell, generally indicated by the reference numeral 38, in order that a suitable electrical connector can be slipped over the lower portion of the plate 10 to connect the conducting strips 36 to external electrical circuitry. Note in FIG. 1 that the strip 36A extends from the bottom of the plate 10 all the way to the top thereof where it terminates in a horizontal portion 40 which is directly opposite a corresponding horizontal portion 42 connected to the patch 16 of electrically conductive material on plate 12. An electrically conductive epoxy material or the like is placed in an opening 44 in the gasket 14 so as to interconnect the portions 40 and 42. With this arrangement, one terminal of a potential source can be connected to the strip 36A and, hence, to the conductive patch 16 on one side of the liquid crystal layer; while selected ones of the remaining strips 36 can be connected to the other terminal of the same potential source, thereby establishing a potential gradient resulting in an electric field across the liquid crystal material in selected areas, depending upon which ones of the strips 36 are energized (i.e., connected to the other terminal of the potential source).

In the manufacture of the liquid crystal unit, the layers of transparent conducting material that are in contact with the nematic-phase liquid crystal material must be prepared by being stroked or rubbed unidirectionally with, for example, a cotton cloth. Furthermore, the transparent conducting material on plate 10 must be rubbed unidirectionally at right angles to the direction of rubbing of the transparent conductive material on plate 12. The effect of this is to produce a twisted nematic structure in the intervening liquid crystal material as is more fully explained in the aforesaid U.S. Pat. No. 3,731,986.

In contact with the plate 10, and covering only the area of the digits or symbols formed by the sets 24-30 of conducting strips is a first polarizing strip 46. The strip 46 may, for example, comprise a film of acetate material or the like having a layer of polarizing material on the inner surface thereof. On the backside of plate 12 is a second polarizing strip 48 similar to strip 46 but of greater dimensions so as to cover the entirety of the transparent plate 12. The planes of polarization of the two strips 46 and 48 are at right angles to each other, the plane of polarization of the strip 46 being parallel to the direction of rubbing of the transparent conductive material on plate 10, and the plane of polarization of strip 48 being parallel to the direction of rubbing on plate 12. Finally, behind the second polarizer 48 is a reflector 50, which is the subject of copending application Ser. No. 364,027, filed May 25, 1973. In essence, it is a reflector which will scatter polarized light without depolarizing the same such that the display can be viewed with ambient light passing into the liquid crystal film from the front and then scattered from the reflector 50. However, instead of using a separate sheet for the reflector 50, it is possible to incorporate powdered aluminum into a resin which is then spread or "painted" onto the back of the polarizer 48. When the resin cures, a film impregnated with powdered aluminum is formed; however it forms an integral part of the back polarizer 48.

In the operation of the device, ambient light impinging on the forward face of the strip 46 will pass through the plate as light polarized in the direction of rubbing of the lines on the transparent conductive material on plate 10. This polarized light, as it passes through the layer of liquid crystal material between the plates 10 and 12, will be rotated through 90°; and this 90° rotation will occur throughout the area of the liquid crystal layer covered by the polarizer 46. The plane of polarization of polarizer 48 is at 90° with respect to that of polarizer 46. Hence, with no electrical potential applied between the electrically conductive films on plates 10 and 12, the polarized light will pass through the entirety of the liquid crystal cell, will be reflected from the reflector 50, and will again pass through polarizer 48, the liquid crystal layer and polarizer 46. Under these circumstances, the entire display will appear white. The light which passes into the cell around the edges of the front polarizer 46 will, of course, not be polarized as it passes through the liquid crystal layer toward the back polarizer 48. However, as it passes through the back polarizer 48 it is polarized, thereafter scattered from reflector 50, and again passes through polarizer 48 and the liquid crystal layer.

Now, if an electrical potential, in the order of 5 volts or greater, is applied between the conducting films on the plates 10 and 12, the liquid crystal unit will no longer rotate the plane of polarization through 90° in the areas of the energized conductive segments on plate 10. Hence, under these circumstances, polarizer 46 will block the light in the areas across which an electrical potential exists and will appear dark on a white background.

In FIG. 3, the numerals "2" and "4" are shown; and this can be achieved by applying a potential of one polarity to the conducting strip 36A for each of these numerals whereby the patches 16 and 18 of electrically conductive material on plate 12 have a potential of one polarity applied thereto while applying a potential of the opposite polarity to the conductors connected to selected ones of the strips in sets 24 and 26 to form the numerals "3" and "4".

Prior to the present invention, the front polarizer 46 covered the entirety of the front face of the liquid crystal cell, such that polarized light passed into the liquid crystal layer across its entire area. In accordance with the present invention, however, the front polarizer 46 covers only the numerals or digits formed by the sets of conducting segments 24-30. In this manner, a border 52 is formed around the numerals on the front face of the liquid crystal display as shown in FIGS. 2 and 3. Unpolarized white light will pass through the front transparent plate 10 and through the liquid crystal layer and back transparent plate 12 to the rear polarizer 48 where it is polarized, following which the polarized light is scattered from the reflector 50 and again passes through the polarizer 48, the plate 12, the liquid crystal layer identified by the reference numeral 54 (FIG. 2) and the front transparent plate 10. As was mentioned above, polarized light, in passing through the liquid crystal layer 54, is partially depolarized for the reason that the liquid crystal molecules are in motion. The use of a polarizer over the sets of conducting strips 24–30 is, of course, a necessity in order to provide polarized light for the twisted nematic structure. However, it is not necessary in the border surrounding the numerals. As a result, and by providing the border 52 (FIGS. 2 and 3) which is not covered by the front polarizer, the attenuation of polarized light in passing from the front of the display to the back is not encountered in the area of the border; and this provides a lighter background for the numerals formed by the sets of conducting segments 24–30. It will be appreciated, of course, that the border 52 need not extend entirely around the sets of conducting segments 24–30 but may, if desired, comprise strips above and below the digits or numerals appearing on the face of the liquid crystal display. In either case, the background against which the numerals are viewed appears brighter than is the case when the front polarizer covers the entire area of the liquid crystal layer.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A liquid crystal display comprising a layer of nematic liquid crystal material disposed between first and second transparent parallel plates, means for effecting a twisted nematic structure in said layer of liquid crystal material, said plates being coated on selected areas thereof with films of transparent conductive material with the conductive material on one plate comprising segments adapted to form symbols in an alpha-numeric display when an electrical field is established between selected segments on one plate and a film of conductive material on the other plate, polarizers on opposite sides of said layer of liquid crystal material with the polarizer adjacent said one plate covering said conductive segments while not covering at least a portion of said one plate around said segments, and a reflector for scattering polarized light behind said other plate.

2. The liquid crystal display of claim 1 wherein said polarizer adjacent said one plate covers only symbols formed by said conductive segments leaving a border around said symbols which is not covered by a polarizer.

3. The liquid crystal display of claim 1 wherein said polarizers are crossed.

4. The liquid crystal display of claim 1 wherein said polarizers are parallel to each other.

5. The liquid crystal display of claim 1 wherein said polarizers are on the sides of said transparent plates opposite said layer of liquid crystal material.

* * * * *